April 14, 1959 P. WILLEMS 2,882,149
FLOW APPARATUS FOR THE CONTINUOUS PHYSICAL AND/OR CHEMICAL
TREATMENT OF SUBSTANCES
Filed April 10, 1956 3 Sheets-Sheet 1

INVENTOR
Peter Willems
BY
ATTORNEY

INVENTOR
Peter Willems

April 14, 1959 P. WILLEMS 2,882,149
FLOW APPARATUS FOR THE CONTINUOUS PHYSICAL AND/OR CHEMICAL
TREATMENT OF SUBSTANCES
Filed April 10, 1956 3 Sheets-Sheet 3
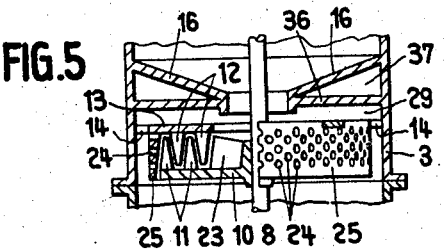
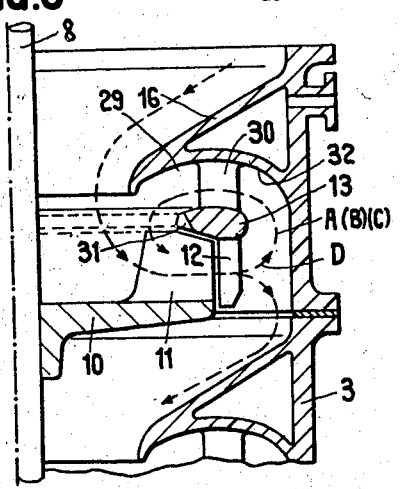
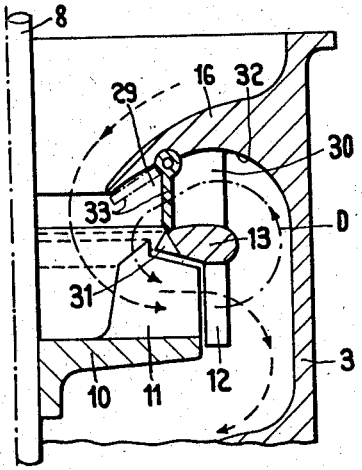
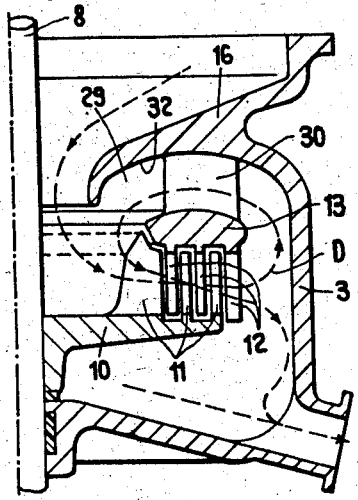
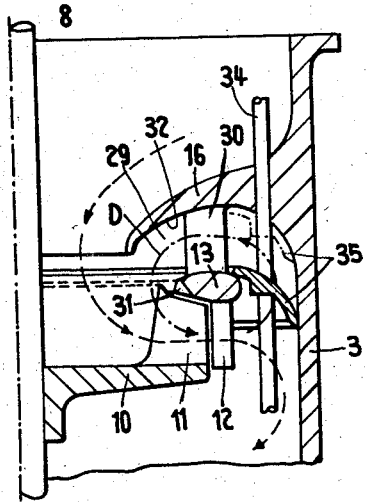
INVENTOR
Peter Willems
BY
ATTORNEY

United States Patent Office 2,882,149
Patented Apr. 14, 1959

2,882,149

FLOW APPARATUS FOR THE CONTINUOUS PHYSICAL AND/OR CHEMICAL TREATMENT OF SUBSTANCES

Peter Willems, Lucerne, Switzerland

Application April 10, 1956, Serial No. 577,313

Claims priority, application Switzerland April 14, 1955

18 Claims. (Cl. 92—20)

Flow and mixing apparatus are already known having several working stages which are arranged in series and are formed by working units each having a stator and a rotor. However, these apparatus are not suitable, or only so to a limited extent, for dispersing and homogenising, for example. After coming out of one mixing stage, the material always passes directly to the next stage. Since, in homogenisation, one proceeds from an unhomogeneous raw material containing various kinds and sizes of parts and usually requiring very intensive treatment, in operating the known mixing apparatus, either very many dispersion stages should be provided, or the material, after passing through the apparatus, is again introduced into this apparatus for further treatment.

Having comparatively few stages, the invention permits the obtaining of very highly dispersed and/or homogeneous end products, without having to return the material to the apparatus for a second passage.

Furthermore, the invention permits a very efficient and economical performance of chemical operations, such as reactions, oxidations, reduction, fission, condensation, polymerisation, coagulation and the like, with or without the use of catalysts. It also permits the gassing or degassing of substances.

The apparatus constructed according to the present invention is characterised by the feature that a circulating path returning to the central supply chamber of the working units is provided from the outlet of the working unit or units to make it possible to effect another passage of the material to be treated through the same working unit.

By throttling or interrupting the passage, it is possible to allow the material to be treated by repeated circulation in the individual working units until it has reached the desired end condition. By this circulation in the individual units an excessive number of stages is therefore obviated as also the re-introduction into the apparatus of the still incompletely treated material.

The accompanying drawings show an embodiment of the apparatus constructed according to the invention, as an example, and a few variations of details.

Figs. 5–9 show variations of details.

Figure 1:
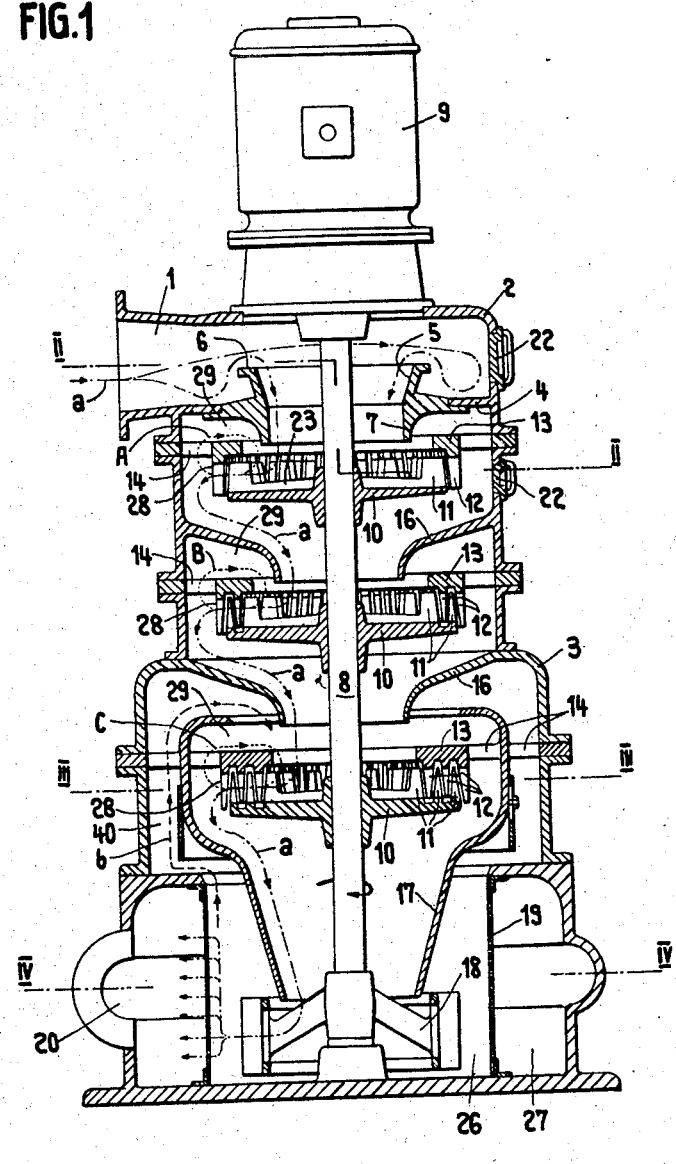
Fig. 1 is a longitudinal section.

The installation according to Figs. 1–4, has an inlet connecting socket 1 on the head piece 2 of the tower-like flow casing 3, an intermediate base 4 of the head piece 2, in the center opening of which is secured the retainer ring 5 with its lip-shaped overflow edge 6 and its funnel-shaped extension 7. A shaft 8 is mounted coaxially to the casing 3 and is driven in the latter by an electric motor 9 or other driving device, if desired, with an adjustable speed. On the shaft 8 three solid rotor discs 10 are mounted at a distance from one another and appertaining to working units constructed as dispersing apparatus and carry crowns of toothed or otherwise shaped comminuting members 11. Instead of being solid, the discs 10 may be perforated that is to say, have spokes. The spokes may be so constructed as to have a pumping action in order to assist the axial conveyance of the material through the spokes. From the hubs of the rotor discs 10 to the members 11 there extend ribs 23 which assist the tangential radial acceleration of the material towards the members 11. The ribs 23 could be omitted or interrupted. The ribs 23 may have a radial or another position. In order to improve the shearing and/or pumping effect or any other effect, the ribs 23 may, for instance, be bent out of the radial direction either towards or opposed to the direction of rotation. Similar may be the case for the members 11 and/or 12. The rotor members 11 run past identically or similarly shaped fixed comminuting members 12 which may be interchangeable, if desired. The stator members 12 are located on annular stator discs 13 which are secured to the casing 3 by arms 14 which are radially or otherwise directed. The rotor discs 10, or one or two thereof, may also have such comminuting members 11 on their underside, in which case the stator members 12 are then dimensioned according to the overall height of the upwardly and downwardly projecting rotor members 11. Each stator 12, 13 forms a working unit with the rotor 10, 11 cooperating with it. Fig. 1 shows three units spaced from one another. The arms 14 of the stator of each working unit leave free between them apertures 15 which form the inlet into the circulating path 29 through which the material can flow back for repeated circulation in the same working unit.

Figure 4:
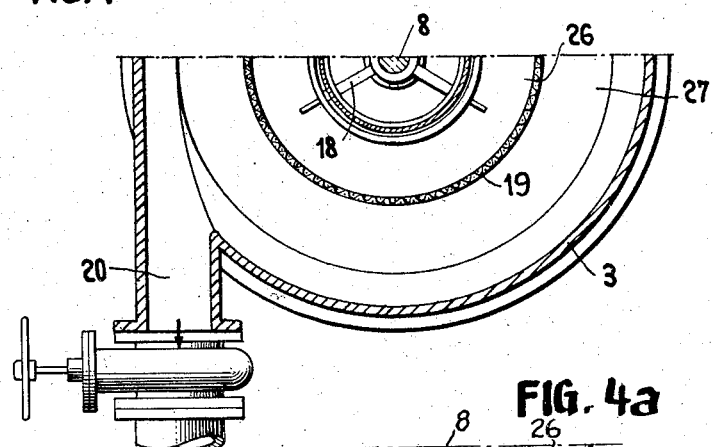
Fig. 4 is a horizontal section on the line IV—IV of Fig. 1.
Figure 4A:
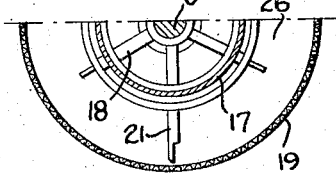
Fig. 4a shows a modification to Fig. 4.

The installation is divided at various places along a horizontal plane and may therefore be composed of individual working stages. Under each of the two upper rotor discs 10 is disposed a hopper 16 whcih conveys the material flowing through the installation to the chamber surrounded by the rotor members 11 of the unit below it. The hoppers 16 may be removable. Under the lowest working unit is a hopper 17. The latter collects the material thrown approximately radially out of the lowest unit 10—13 and conveys it to the interior of a pump impeller 18 secured to the shaft 8 and which is surrounded by a sieve cylinder 19 used for sifting the material. To the casing 3 there is tangentially attached, in the region of the sieve cylinder 19, an outlet pipe connection 20 (Fig. 4) which is used for moving the finished product from the installation. One or more vanes of the impeller 18 may be so arranged or lengthened arms 21 (Fig. 4a) that they sweep the sieve cylinder 19 by their outermost edges for the purpose of freeing the holes in the sieve from material accumulated on the inner surface of the cylinder 19. At every important place closable inspection holes are arranged having covers 22 for checking and cleaning purposes. The inspection holes may also be used for the attachment of pipe lines or for connecting to containers or other devices.

The raw material, for example, wood intended for producing cellulose pulp and already boiled or chemically treated, is pumped in comminuted form and mixed with water into the head piece 2 through the inlet connection 1, in the direction of the arrow a or introduced by dropping in or sucked by the pumping action of the device itself. The inlet connection 1 is attached to the head piece 2 at least approximately tangentially, similarly as in the case of the outlet connection 20. The tangential arrangement has the result that the material consisting of water and wood first shoots along in a circle on the vertical inner wall of the head piece 2 until it flows with slackening of its speed, in a spiral, on to the base 4 and then, owing to the delivery of further material, over the over-flow 6, through the retaining ring 5, along the path indicated by the arrow *a* to the first working unit 10—13. Specifically heavy parts, such as metal members, nails, stones are retained, owing to their heavier specific gravity, on the base 4 of the apparatus which has a cyclonic action and consists of the parts 2, 4 and 5, whereas the water and wood mixture flows over the over-flow edge 6. The inlet connection 1 could be attached other than tangentially, such as radially or coaxially, to the head piece 2.

The effect of the cooperation of the stator and rotor in each of the working units 10—13, constructed as dispersion devices, is thoroughly described in Swiss patent specifications 288,154 and 311,794, for example, and therefore needs no further special explanation here. If the crowns 11 and/or 12 are constructed as cylindrical or conical rings concentric to the shaft which are wholly or partly provided with interruptions having a completely enclosed cross section, such as bores which are radial or deviate from the radius, and/or nozzles of any shape, size or degree of fineness, then an extremely high degree of fineness is obtained in the product. For example, Fig. 5 shows a construction where the outer stator crown is formed by a cylindrical ring 25 provided with bores 24, secured to the disc 13. The ring 25 may be removable or interchangeable.

The decomposing action of the working unit may be regulated by conically tapering the members 11 and/or 12 towards their free ends, making them axially displaceable with the result that the radial gap between the members 11 and 12 can be widened or narrowed.

The material which has been more or less decomposed in the first working unit 10—13, is thrown out under pressure at the periphery of this unit and flows in the case of a direct through-flow, along the arrow line *a*, through the first hopper 16 into the second working unit 10—13. The latter is constructed in principle just like the upper unit, but can be adapted to the existing purpose. Thus, for example, the members 11 of the second unit may be curved or straight in order to assist, as required, the radial acceleration or the tangential acceleration, or to influence the shearing or rebounding effect, respectively.

Figure 2:
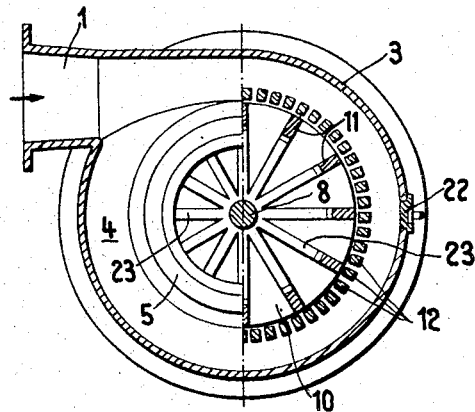
Fig. 2 is a horizontal section on the line II—II of Fig. 1.

The same may be stated in connection with the third unit 10—13, to which the material passes through the hopper 16 disposed under the second unit. The number of working units may be increased or reduced to one or two units, for example. At the same time, each unit following upon another working unit may be provided with an increased number of rotor and stator members arranged concentrically to one another. Similarly, a progressively narrower, that is to say, finer pitch of the series of members, and smaller member cross-sections with increasingly more members and slots or bores may be provided from stage to stage, just as from the inner to the outer series of members. From unit to unit this leads to an increasing frequency of the physical effects. This increasing action is achieved in the embodiment shown in Figs. 1–4 in the following manner: The first working unit 10—13, to which the coarse material, such as wood shavings or wood prunings, or other organic or inorganic materials is conveyed, is provided with thicker members 11, 12 and with a greater pitch between the stator members 12 (Fig. 2). Likewise in this unit, the pitch between the rotor members 11 is very great (Fig. 2) so that the coarse material is gripped by them, broken up on the stator and decomposed to such an extent that it is thrown out through the coarse-slotted stator member crown along the arrow line *a*. The pitch, number and form of the rotor and stator members, as also the speed of the rotor determine the frequency of the rebounding, shearing and other effects.

Figure 3:
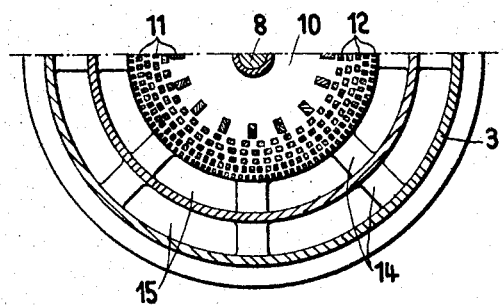
Fig. 3 is a horizontal section on the line III—III of Fig. 1.

The material which is decomposed only preparatorily and gently, for example, in the first unit 10—13, reaches the second working unit 10—13 along the arrow line *a*. The latter unit has several concentric rotor or stator crowns respectively. The innermost rotor crown 11 consists of scoop-like beaters, the cross section of which may be smaller than that of the innermost rotor members 11 of the previous unit, because the material flowing into the second unit 10—13 is already partly decomposed. For this reason the pitch between the rotor members 11 of the second unit may be smaller than in the first unit. The same applies to the transition from the second to third unit (Fig. 3).

In order to increase the effect gradually on the already considerably changed material, each of the concentric crowns of the members may have, within the same working unit, from inside towards the outside, a progressively finer pitch, that is to say, for example, smaller and closer members and slots or other openings (such as sieve-like bores) between the latter. The innermost crown of a unit then has the greatest, and the outermost crown, the finest pitch. By this means a progressively increased refinement of the material, not only from one working unit to the other, but also from one inner to the next and other outer crowns of the members, is obtained in each unit. The radial width of the members of the outermost pair of crowns could be greater than those of a pair disposed further inward.

If the material, such as a mixture of water and wood cellulose, has passed through the various units 10—13 to the lowest, it represents the decomposed fibrous material distributed in water. Apart from the cellulose decomposed down to the individual fiber, this mixture usually contains coarser bunches of fiber and inclusions which must be separated out. In order to avoid the loss of this material, it can be separated from the cellulose in the installation in a final working of the sifting stage and returned again to the working cycle. For this purpose the installation shown in Figs. 1–4, is provided with a filter or sifting device having the sieve 19 which is cylindrical for example. The sieve cylinder 19 divides the inside of the casing into a centre chamber 26 and an annular outer chamber 27 arranged between the filter cylinder 19 and the casing 3. The hopper 17 guides the material coming from the last working unit 10—13 to the chamber 26 where it is caught by the impeller 18 and put into a radial/tangential flow. With a suitable speed of rotation and a suitable form of vane of the impeller 18, this flow results in the formation of an overpressure zone on the inner side of the cylinder 19. At the same time the sucking off of the water passing into the outer chamber 27 through the sifting cylinder 19 and enriched with cellulose fiber, is effected by means of pumps (not shown) or other conveying means, through the outlet 20. The amount of outflow and, consequently the speed of flow of the mixture of water and cellulose fiber out of the outer chamber 27 through the outlet 20 can be kept constant by valves (not shown) or other known devices or, if required, regulated or entirely interrupted. Within the filter or sieve cylinder 19 the still insufficiently decomposed material is enriched in the meantime in the form of rather coarse bunches of fiber and fragments which cannot pass through the cylinder 19. This material is now urged upwardly by the over-pressure inside the cylinder 19, along the arrow line *b*, through the circulation path 40 between the hopper 17 and the casing 3, and returns, in the casing 3 outside the hopper 17 and over its upper edge, to the supply chamber of the lowest working unit 10—13. It becomes mixed with the material being processed in this unit and is decomposed further in order to flow again through the hopper 17 into the region of the impeller 18 and then through the filter cylinder 19 into the outer chamber 27 and the pipe 20. It is possible that, in this last working operation also, the still insufficiently decomposed portions of material in the last unit 10—13 are again returned through the circulation path 40 for treatment in the last unit 10—13 and this is repeated until the decomposition is sufficient and the individual particles (fibers), can pass through the filter cylinder 19.

The installation according to the present invention, which may be constructed without a cyclone 4, 5, 6 as a first working stage and/or without a sifting device 17, 18, 19, as a last working stage, makes it possible to treat the material as long as possible in the individual working stages or units 10—13 until the desired degree of decomposition of the material is reached. The duration of this treatment can be regulated by adjusting the speed of flow of the material through the apparatus within any desired limits. This is achieved by the feature that the out-flow of the finished product through the outlet 20 is controlled by the above-mentioned regulating and closing member. In the event of complete closing of the outlet 20, the whole installation is filled with material through the inlet pipe 1. Since the material cannot flow off at the bottom, it is continuously circulated through the individual working units 10—13 along the closed arrow lines A, B and C and thereby progressively comminuted. By omitting or removing the hoppers 16 this circulating operation A, B, C can be assisted in that no separating resistances impede the flow in the casing 3. This continuous circulation A, B, C of the material in the individual working unit 10—13 is possible, because the material can flow through the circulating path 29 owing to the apertures 15, said path being separated by the discs 13 from the reaction spaces 11, 12 of the units 10—13.

If, in the event of the outlet 20 being completely open, the material can flow out of the apparatus shown in Fig. 1 as quickly as it is introduced into the installation, no circulation, A, B, C at all of the material takes place in the individual working units 10—13. In this case, the material will on the whole take the path of least resistance and flow through the installation from top to bottom without circulations A, B, C. If the degree of fineness achieved in this direct flow of material through the installation is not sufficient, then, by regulating the speed of the flow, as described above, the circulations A, B, C can be achieved in the individual working units and consequently a higher degree of decomposition achieved. The latter is also achieved by the feature that when the speed of flow is constant the effective frequency is increased between the members 11 and 12, that is to say, by increasing the speed of the shaft 8.

In Figs. 1 and 5 the partition between the reaction space of the working units, in which the members 11, 12 are disposed, and the path 29 of circulation, is formed by the stator disc 13 which is secured to the casing 3 by means of the arm 14. In the variations in Figs. 6–9, the stator ring 13 forming the partition is secured by means of cross pieces or webs 30 approximately parallel to the shaft 8, that is to say, to the main flow direction, to the underside of the hopper 16, that is to say, to a part fixed to the casing 3. These cross pieces 30 are distributed on the periphery of the stator ring 13 at spaces from one another. The cross section of the cross pieces 30 may be in a meridian plane passing through the axis of the shaft 8 or at an angle to this plane. To reduce flow losses the cross section of these cross pieces 30 may be constructed like the guide vanes of a turbine. In Figs. 6, 7, 9, one or more tearing teeth 31 distributed over the periphery of the ring 13, or other tearing members, are provided on the ring 13, by which lumpy or streaky material propelled around by the rotor members 11 is torn to pieces in order to prevent blocking of the rotor. The innermost members 11 of the rotor in Figs. 6–9 are so widened that they are, at least partly on their free ends, not covered in the axial direction of the stator ring 13 and thus can catch and tear the material. In Figs. 7, 8 and 9 these free ends of the members 11 are provided with tearing teeth. The cross section of the stator ring 13 and the lower side 32 of the hopper 16 are selected with respect to efficient guidance of the circulatory movement A, B, C of the material.

Fig. 7 differs from Fig. 6 by hinge-like closure flaps 33 arranged between adjacent cross pieces 30 and opening automatically under the excess pressure possibly prevailing outside the flaps. The latter are intended to prevent the material flowing through the circulatory path 29 about the stator and the rotor, instead of into the center supply chamber of the rotor. This could occur, for example, if the flow speed of the material does not allow for a satisfactory excess pressure to occur on the wall of the casing. Such a closure device could be constructed also according to Fig. 9, for example, where the circulatory path 29 can be closed by an annular disc 35 suspended from axially displaceable rods 34. In the event of an excess pressure between the stator ring 13 and the casing 3, the disc 35 is automatically raised and opens the circulatory path 29, whereas, if there is an insufficient excess pressure, it drops automatically into the closed position. If desired, the excess pressure occurring in the apparatus in the case of a completely or partly closed outlet, may be used to remove said excess pressure or to interrupt, periodically reduce or even control the excess pressure. This is effected by coupling the hinge-like closure flaps 33, for example, through the hinge spindle, with the outlet valve, possibly with the insertion of optical, electric or hydraulic transmission or amplifying systems of known kind. The same object may be achieved by coupling the lifting and guide rods 34 to the outlet valve, if necessary, also with the insertion of transmission or amplifying systems. Similarly, regulation or control of the inlet of the material into the apparatus may be effected in the same manner.

Fig. 8 differs from Figs. 6, 7, 9 by the feature that the stator ring 13 and the rotor disc 10 carry three crowns of members 12 or 11 respectively.

In case the stator members 12 are directly fixed to the hopper 16, openings can be provided in the hopper wall, which can be closed by closing members of similar or other kind than shown in Figs. 7 and 9 and similarly or otherwise controlled than described above with regard to Figs. 7 and 9. The circulatory path 29 would then go through the hopper wall. Similar closable openings on the hopper may also be provided if the stator members 12 are not fixed to the hopper.

Instead of mounting the flaps on horizontal axes as shown in Fig. 7, they may be arranged on vertical axes.

Fig. 5 shows under the hopper 16 a wall 36 which forms the upper limit of the circulation path 29. Hopper, wall 36 and casing 3 enclose a hollow space 37 which is adapted to receive a heating or cooling medium.

The installation constructed according to the invention may be separated into two or more parts. Thus, for example, the top part of the construction shown in Fig. 1, that is to say, the retaining ring 5 with the inlet 1 alone, also with or without one or more units 10—13 located below it, may be erected as a separate structural unit and the remaining part of the installation, consisting of one or more working units 10—13 and the sifting plant 17, 18, 19, assembled separately and disposed below or by the side of the said first structural unit. In this case the transference of the material flowing out of the first partial unit into the second partial unit is effected through connecting members, such as hoppers, pipe lines, pumps or also by natural fall.

If a cyclone is present, the top part 2 of the casing with the retaining ring 5 may be separated from the main part of the installation, and erected, for example, above or by the side of the main installation. In order to improve the retention of harmful or destructive solid and heavy bodies such as stones and metal parts etc. and to improve efficiency, more than one such separating device may be connected with the retaining ring 5 in series, in parallel or one above the other and connected by joining their casings by pipe lines, funnel inserts, pumps etc. The retaining effect is adapted to the flow speed, the nature of the foreign bodies, by suitable dimensions and shaping of the retaining ring 5 and the over-flow edge 6. Thus, for example, the retaining ring 5 with its over-flow edge 6 may also be enlarged beyond the diameter of the inlet connection 1, with the result that the entire in-flowing mixture from the inlet connection 1 must rise on the retaining ring 5 as it circulates round the same as high as the over-flow edge 6, in order then to pass into the retaining ring 5. The foreign bodies are removed from time to time from the base 4 of the casing. To increase the separating action of the cyclone, magnets may be arranged on or near said cyclone.

The installation constructed according to the invention may be arranged in any position other than vertical, such as horizontal or inclined, suitable conveyor devices such as pumps feeding the material to be treated to the installation. Similarly, the parts of the instllation may be driven individually or in groups.

Both the solid material to be comminuted or unravelled and the liquid medium (vehicle) such as water, may be fed separately, the mixing then being effected inside the installation.

In constructions according to the present invention, other than that shown in Fig. 1, the cyclone 4—7 and/or other sifting device 18, 19, may be omitted. The first working stage may then be formed, for example, by a working unit 10—13, to which the material is conveyed from one or more feeding containers, for example. In this feeding container or containers a dispersing device, for example, such as that according to Swiss Patent 311,-794, may be fitted for comminuting the material.

The return of the material from a working stage into a preceding stage could also be effected by connections outside the casing, such as tubes connected to the casing. Such connections may lead from one stage to each preceding working stage, possibly skipping an intermediate stage. These connections may be provided with automatic controls. Pipe bends or the like attached to the outside of the casing which render possible the circulations A, B, C may also be provided for the individual working units 10—13, instead of the openings between the arms 14 or the cross pieces 30.

It is obvious that chemical reactions also may be initiated and directed by the apparatus constructed according to the present invention, if reacting substances are treated together, such as the preparation of silicic acid gel, by treating alkaline silicates in the apparatus with hydrochloric acid.

What I claim is:

1. In a flow apparatus for treating materials, an upright cylindrical housing, a prime mover, a rotatable shaft in and coaxial to said housing, coupled with said prime mover, spacedly arranged disintegrating units in and coaxial to said housing, each of said units comprising, a centrally pierced stator disc, a holding means in fixed relation with said housing and with said stator disc, a circular row of spacedly arranged cutting stator teeth fixed to said stator disc at a radial distance from the inner wall of said housing to form together with said wall an annular discharge space, a rotor disc fixed to said rotatable shaft and disposed at an axial distance from said stator disc, a circular row of spacedly arranged cutting rotor teeth fixed to said rotor disc and surrounding a central inlet space, said rotor teeth being concentric to and surrounded by said stator teeth in close radial proximity for cutting cooperation with said stator teeth, hoppers fixed to said housing, each hopper belonging to one of said units and being arranged above and spaced from the stator disc of the respective unit to form together with said stator disc a passage way opening to said central inlet space, an aperture in said holding means to allow re-circulations of the material in one and the same unit from said annular discharge space through said passage way to said central inlet space, a feeding means above the uppermost unit, and a discharge means after the lowermost unit.

2. In a flow apparatus for treating materials, a housing, a drive means, a rotatable shaft in said housing, coupled with said drive means, spacedly arranged disintegrating units in said housing, each of said units comprising, a central inlet space, a stator having a central inlet hole communicating with said central inlet space, a discharge space formed by said housing and said stator, holding means in fixed relation with said housing and said stator, apertures in said holding means communicating with said discharge space, said central inlet space and fixed to said rotatable shaft concentrically to said stator for pulsating cutting cooperation with said stator, a passage extending on the outside of said stator and connecting said apertures with said central inlet hole to allow recirculation of the material to be treated within a unit from said discharge space through said passage to said central inlet space before flowing to the next unit, a feeding means preceding the first unit, and a discharge means after the last unit.

3. In a flow apparatus according to claim 2, said holding means forming webs leaving said apertures between them.

4. In a flow apparatus according to claim 2, said holding means forming radial arm-like webs leaving said apertures between them.

5. In a flow apparatus according to claim 2, said holding means forming at least approximately axially directed webs leaving said apertures between them.

6. In a flow apparatus according to claim 2, said holding means being webs leaving said apertures between them and being arranged and designed as guiding vanes.

7. In a flow apparatus for treating materials, a housing, a feeding means on said housing, a discharge means on said housing, a drive means, a rotatable shaft in said housing, coupled with said drive means, a disintegrating unit in said housing after said feeding means and in front of said discharge means, comprising, a stator forming together with said housing a discharge space, a central inlet space, a rotor surrounding said central inlet space and fixed to said rotatable shaft in close proximity to said stator for pulsating cutting cooperation with said stator, a flow means connecting said discharge space with said inlet space outside said stator and rotor to allow repeated re-circulation of the material to be treated in said unit from said discharge space to said central inlet space before flowing to said discharge means.

8. In a flow apparatus according to claim 7, said stator comprising a tearing means in the region of the inlet of said rotor.

9. In a flow apparatus according to claim 7, an automatically acting closure member in the path of recirculation.

10. In a flow apparatus according to claim 7, said stator having perforations of a cross section enclosed on all sides.

11. In a flow apparatus for treating materials, a housing, a drive means, a rotatable shaft coupled with said drive means, disintegrating units spacedly arranged in series in said housing, each of said units comprising, a centrally pierced stator forming together with said housing a discharge space and including spacedly arranged cutting stator members, a rotor surrounding an inlet space and fixed to said rotatable shaft, including spacedly arranged cutting rotor members, at least some of said stator members cooperating with at least some of said rotor members to form together with the latter a disintegrating group of a unit, the subsequent disintegrating unit having more disintegrating groups than the preceding unit, a flow means connecting said discharge space with said inlet space outside said stator and rotor to allow recirculation of the material to be treated within a unit from said discharge space to said inlet space before flowing to the next unit, a feeding means preceding the first unit, and a discharge means after the last unit.

12. In a flow apparatus for treating materials, a housing, a drive means, disintegrating units spacedly arranged in series in said housing, each of said units comprising, a centrally pierced stator forming together with said housing a discharge space and including cutting stator members spaced from one another by free gaps, a rotor coupled with said drive means, surrounding an inlet space and including cutting rotor members spaced from one another by free gaps and arranged for cutting cooperation with said cutting stator members, the cross sections of said stator and rotor members of the subsequent unit and the free gaps between them being smaller than the cross sections of the stator and rotor members and the gaps of the preceding unit and the number of said members of the subsequent unit being greater than the number of said members of the preceding unit, a flow means connecting said discharge space with the inlet space outside said stator and rotor to allow returning of the material to be treated within a unit from said discharge space to said inlet space before flowing to the next unit, a feeding means preceding the first unit, and a discharge means after the last unit.

13. In a flow apparatus for treating materials, a housing, a drive means, a rotatable shaft coupled with said drive means, disintegrating units spacedly arranged in series in said housing, each of said units comprising, a centrally pierced stator forming together with said housing a discharge space and including cutting stator members leaving gaps between them, a rotor surrounding an inlet space and fixed to said rotatable shaft, including cutting rotor members leaving gaps between them, at least some of said stator members cooperating with at least some of said rotor members to form together with the latter a disintegrating group of a unit, the subsequent disintegrating unit having more disintegrating groups than the preceding unit, a flow means connecting said discharge space with said inlet space outside said stator and rotor to allow recirculation of the material to be treated within a unit from said discharge space to said inlet space before flowing to the next unit, a feeding means preceding the first unit, and a discharge means after the last unit, the cross sections of cutting stator and rotor members of the subsequent disintegrating unit and the width of said gaps decreasing from the inner disintegrating group to the outer disintegrating group and the number of these members increasing from the inner disintegrating group to the outer disintegrating group.

14. In a flow apparatus for treating materials, an upright housing, a cyclonical device at the top of the housing for separating specifically heavy bodies, a drive means, disintegrating units spacedly arranged in series below said cyclonical device and in said housing, each of said units comprising, a centrally pierced stator including spacedly arranged cutting stator members, a rotor coupled with said drive means, including spacedly arranged cutting rotor members arranged for pulsating cutting cooperation with said cutting stator members, said stator being fixed to said housing in a manner to provide for free passage between said stator and the inner wall of said housing to allow recirculation of the material to be treated within a unit before flowing to the next unit, a separating means after the last disintegrating unit for separating the completely treated material from the remaining material, means for returning the incompletely treated material, which cannot pass said separating means, to one of said disintegrating units, a feeding means to said cyclonical device, and a discharge means after said separating means.

15. In a flow apparatus for treating materials, a device for separating specifically heavy bodies, a through flow casing following said device, a drive means, a distintegrating unit in said through flow casing, comprising, a centrally pierced stator, a rotor coupled with said drive means, arranged for cutting cooperation with said stator, a separating means after said disintegrating unit for separating the completely treated material from the remaining material, means for returning the incompletely treated material, which cannot pass said separating means, to said disintegrating unit, a feeding means to said device, and a discharge means after said separating means.

16. In a flow apparatus according to claim 15, said device for separating specifically heavy bodies comprising a retaining ring, a catching chamber surrounding said retaining ring, and an inlet socket communicating tangentially with said catching chamber.

17. In a flow apparatus for treating materials, a housing, a drive means, a disintegrating unit in said housing, comprising, a stator, a rotor coupled with said drive means, arranged for cutting cooperation with said stator, a separating means after said distintegrating unit for separating the completely treated material from the remaining material, means for returning the incompletely treated material, which cannot pass said separating means, to said disintegrating unit, a feeding means to said housing, and a discharge means after said separating means.

18. In a flow apparatus according to claim 17, said separating means comprising a screening sieve, a pump impeller arranged inside said screening sieve for returning material which has not been let through by said screening sieve.

References Cited in the file of this patent

UNITED STATES PATENTS

| | | |
|---|---|---|
| 1,556,926 | Fritz | Oct. 13, 1925 |
| 1,556,927 | Fritz | Oct. 13, 1925 |
| 1,913,540 | Fritz | June 13, 1933 |
| 2,718,178 | Wandel | Sept. 20, 1955 |

UNITED STATES PATENT OFFICE

CERTIFICATE OF CORRECTION

Patent No. 2,882,149  April 14, 1959

Peter Willems

It is hereby certified that error appears in the printed specification of the above numbered patent requiring correction and that the said Letters Patent should read as corrected below.

Column 8, line 21, after "discharge space," insert -- a rotor surrounding --.

Signed and sealed this 15th day of September 1959.

(SEAL)
Attest:
KARL H. AXLINE
Attesting Officer

ROBERT C. WATSON
Commissioner of Patents